Sept. 26, 1950     N. B. WILLIAMSON     2,523,893
CART FOR TRANSPORTING GOLF BAGS
Filed Dec. 6, 1948     2 Sheets-Sheet 1
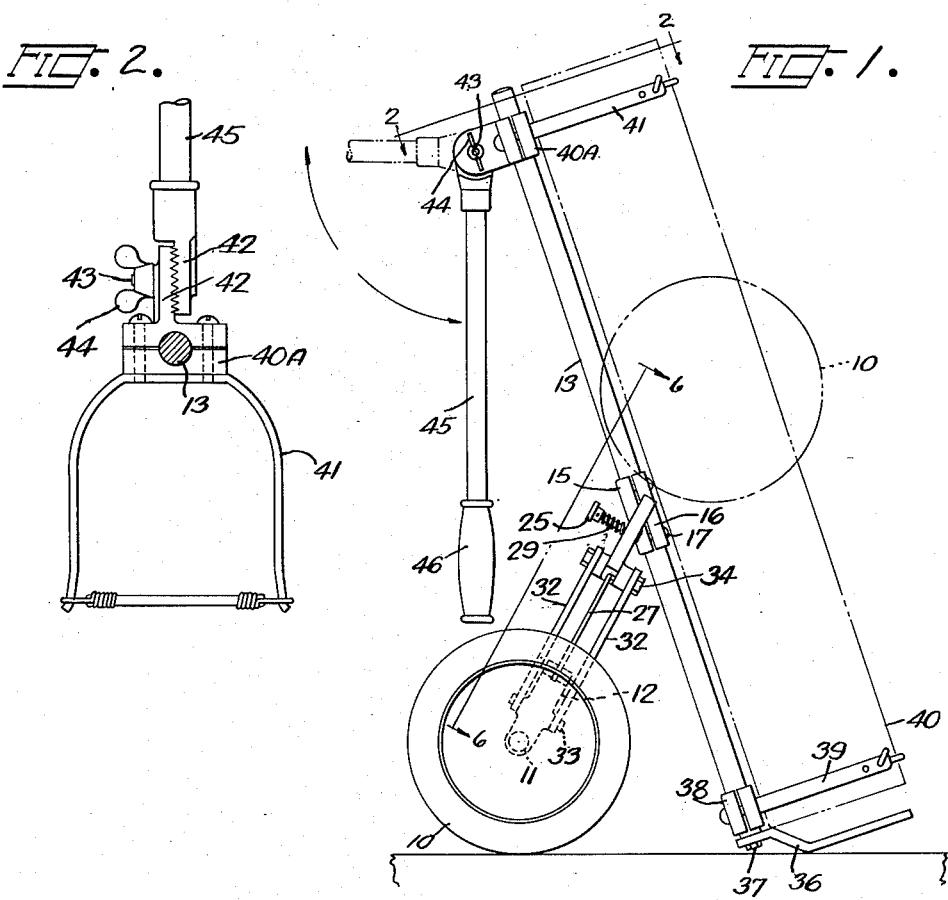
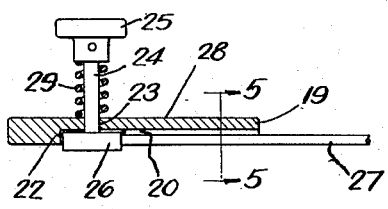
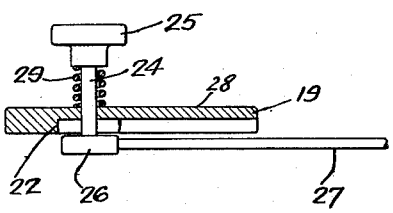
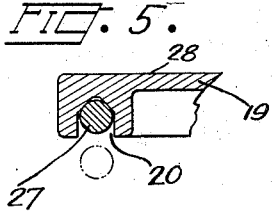
INVENTOR
NORMAN B. WILLIAMSON
BY
ATTORNEY

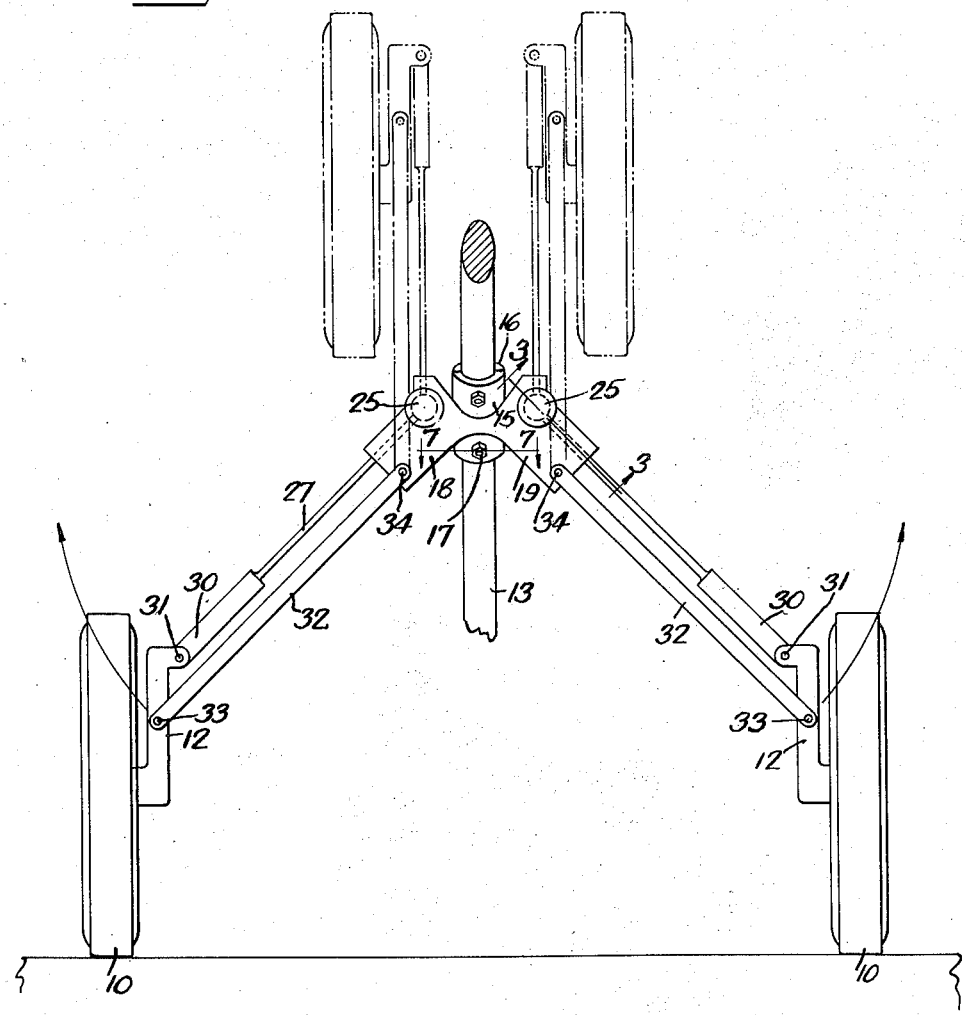
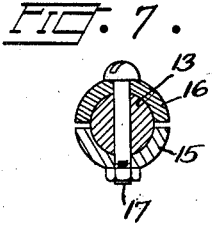
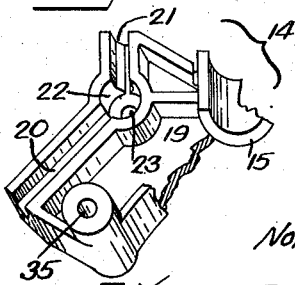

Patented Sept. 26, 1950

2,523,893

UNITED STATES PATENT OFFICE 2,523,893

CART FOR TRANSPORTING GOLF BAGS

Norman B. Williamson, Portland, Oreg.

Application December 6, 1948, Serial No. 63,785

1 Claim. (Cl. 280—40)

This invention relates generally to vehicles and particularly to carts for transporting golf bags.

The main object of this invention is to provide a spring mounted cart by means of which a golf bag can be easily transported on the ground or held in a convenient position for the removal or replacement of clubs or folded to a compact form for travelling or storage purposes.

I accomplish these and other objects in the manner set forth in the following specification as illustrated in the accompanying drawing, in which Fig. 1 is a side elevation showing the cart in an upright resting position.

Fig. 2 is a fragmentary section taken along the line 2—2 in Fig. 1.

Fig. 3 is a fragmentary section taken along the line 3—3 in Fig. 6, showing the parts in a latched position.

Fig. 4 is a view similar to Fig. 3 but showing the parts in an unlatched position.

Fig. 5 is a fragmentary section taken along the line 5—5 in Fig. 3.

Fig. 6 is a front elevation showing in full lines the parts in a standing position and in dotted lines the parts in a folded position.

Fig. 7 is a section taken along the line 7—7 in Fig. 6.

Fig. 8 is a fragmentary perspective of the latching plate.

Like numbers of reference refer to the same or similar parts throughout the several views.

Referring in detail to the drawings, there is shown a pair of ground engaging wheels 10, each of which has an axle 11 to which is attached an arm 12 which is parallel to the plane of its respective wheel 10.

Midway between the wheels 10 is a rod frame 13 between the ends of which is disposed a latch plate 14 whose clamping portions 15 and 16 are united by the bolts 17 which pass through the rod 13 and hold the plate 14 at a fixed angle with relation to the rod 13.

The frame 14 has two branches 18 and 19 which extend on opposite sides of the frame 13. Each branch 18 and 19 has formed therein the pair of slots 20 and 21, the bottom portions of which are V-shaped. The slots 21 of both branches are parallel to each other and to the longitudinal vertical plane of the cart. Each slot 20 is inclined with relation to its slot 21 and the two slots 20 and 21 terminate in a cylindrical recess 22, in the bottom of which is a hole 23, through which extends a plunger 24, on one end of which is a push button 25 and at the other end of which is a head 26 to which is attached the upper link 27 of spring material adapted to occupy either slot 20 or 21. Between the button 25 and the back 28 is placed a spring 29 which urges the head 26 toward the recess 22 and the link 27 against the V bottom of the slots 20 and 21.

The end 30 of each upper link 27 is joined by a pin 31 to the upper end of an arm 12. A pair of lower links 32 are joined by the bolts 33 to intermediate portions of the arms 12 and to the plate 14 by the bolts 34 which pass through the openings 35.

Each upper link 27 and pair of lower links 32 are substantially the same length and parallel to each other, thereby forming a parallelogram and insuring the wheels 10 occupying parallel planes in their various positions.

On the lower end of the frame 13 is secured a foot 36 by means of a bolt 37. A frame clamp 38 is disposed above the foot 36 and has attached thereto a bag encircling clamp 39 which encircles the lower end of the bag 40.

At the upper end of the frame 13 is secured a clamp 40—A, to which is secured the upper bag clamp 41. Also attached to the clamp 40—A are radially fluted clamps 42 through which pass a bolt 43 on which is placed a wing nut 44.

Extending from a clamp 42 is the lever 45 on the end of which is a handle 46.

In the operation of the device, when the parts are in the extended position as shown in Fig. 1 and it is desired to collapse the cart, it is only necessary to press on the button 25 which will move the links 27 out of engagement with the slots 20 and permit their respective wheels 10 to be moved upwardly and against the bag 40 where they will be latched by the links 27 engaging the slots 21.

To restore the parts to the extended position, the operation is reversed.

Attention is drawn to my Patent No. 2,443,847, June 22, 1948, over which the device described herein is an improvement.

I claim:

A cart for golf bags having in combination a frame, a pair of wheels for supporting said frame having a common transverse axis, a latch plate mounted on said frame having slots formed therein, a plurality of links forming portions of hinged parallelograms joining said wheels to said frame, one link on each side of said frame being resilient and adapted to occupy one of said slots and means for selectively moving said spring links out of engagement with a slot, whereby the relationship of said wheels and frame can be changed from an extended to a retracted position.

NORMAN B. WILLIAMSON.

REFERENCES CITED

The following references are of record in the file of this patent:

UNITED STATES PATENTS

| Number | Name | Date |
|---|---|---|
| 2,326,482 | Moffitt | Aug. 10, 1943 |
| 2,443,847 | Williamson | June 22, 1948 |
| 2,447,705 | Macip | Aug. 24, 1948 |